(12) United States Patent
Landsteiner et al.

(10) Patent No.: US 12,346,735 B2
(45) Date of Patent: Jul. 1, 2025

(54) WORKLOAD EXECUTION ON BACKEND SYSTEMS

(71) Applicant: HEWLETT PACKARD ENTERPRISE DEVELOPMENT LP, Houston, TX (US)

(72) Inventors: Benjamin Robert Landsteiner, Bloomington, MN (US); Jon Gregory Hendrickson, Bloomington, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 575 days.

(21) Appl. No.: 17/656,722

(22) Filed: Mar. 28, 2022

(65) Prior Publication Data

US 2023/0305900 A1 Sep. 28, 2023

(51) Int. Cl.
*G06F 9/50* (2006.01)
*G06F 9/4401* (2018.01)

(52) U.S. Cl.
CPC ............ *G06F 9/505* (2013.01); *G06F 9/4411* (2013.01); *G06F 9/5038* (2013.01); *G06F 9/5044* (2013.01)

(58) Field of Classification Search
CPC ...... G06F 9/505; G06F 9/4411; G06F 9/5038; G06F 9/5044; G06F 9/5005; G06F 9/5027; G06F 8/65
See application file for complete search history.

(56) References Cited

U.S. PATENT DOCUMENTS

| | | | | |
|---|---|---|---|---|
| 2002/0075510 | A1* | 6/2002 | Martinez | G06F 3/1205 358/1.14 |
| 2002/0116457 | A1* | 8/2002 | Eshleman | H04L 67/288 709/203 |
| 2003/0014251 | A1* | 1/2003 | Pokhariyal | G10L 15/26 704/E15.044 |
| 2003/0037180 | A1* | 2/2003 | Madineni | G06F 9/542 719/321 |
| 2003/0103234 | A1* | 6/2003 | Takabayashi | H04N 1/00188 358/1.15 |
| 2003/0115305 | A1* | 6/2003 | Murray | H04L 41/22 714/48 |
| 2004/0257612 | A1* | 12/2004 | Okabe | G06F 3/1288 358/1.18 |
| 2006/0017960 | A1* | 1/2006 | Kakigi | H04N 1/00923 358/1.14 |
| 2008/0147578 | A1* | 6/2008 | Leffingwell | G06F 16/951 706/20 |
| 2008/0269958 | A1* | 10/2008 | Filev | G06N 3/006 701/1 |
| 2008/0281580 | A1* | 11/2008 | Zabokritski | G06F 40/211 704/9 |

(Continued)

Primary Examiner — Tuan C Dao
(74) Attorney, Agent, or Firm — Fletcher Yoder, P.C.

(57) ABSTRACT

In some examples, a system includes a plurality of drivers for respective backend systems that are to perform workload tasks. A workload service receives, from a workload manager, job information relating to a workload, the job information submitted by a requester and the job information uninterpreted by the workload manager. In response to receiving the job information, the workload service presents state information representing states of the workload. As the state information is updated during performance of tasks of the workload by at least one driver of the plurality of drivers, the workload service provides the updated state information to the plurality of drivers.

19 Claims, 5 Drawing Sheets

(56) References Cited

U.S. PATENT DOCUMENTS

| | | | |
|---|---|---|---|
| 2015/0121134 A1* | 4/2015 | Wipfel | G06F 11/2094 |
| | | | 714/6.31 |
| 2016/0098284 A1* | 4/2016 | Herberg | G06F 9/4411 |
| | | | 719/327 |
| 2017/0206236 A1* | 7/2017 | Kharatishvili | G06F 16/23 |
| 2018/0241802 A1* | 8/2018 | Bernat | H04L 43/0894 |
| 2019/0102440 A1* | 4/2019 | Tabak | G06F 3/0482 |
| 2020/0301635 A1* | 9/2020 | Ogawa | G06F 3/1271 |

* cited by examiner

WORKLOAD EXECUTION ON BACKEND SYSTEMS

BACKGROUND

Workloads can be executed on computer systems. A workload can be performed in response to a request from a requester, which can be a user, a program, or a machine. Different workloads may be executed on different computer systems.

BRIEF DESCRIPTION OF THE DRAWINGS

Some implementations of the present disclosure are described with respect to the following figures.

Figure 1:
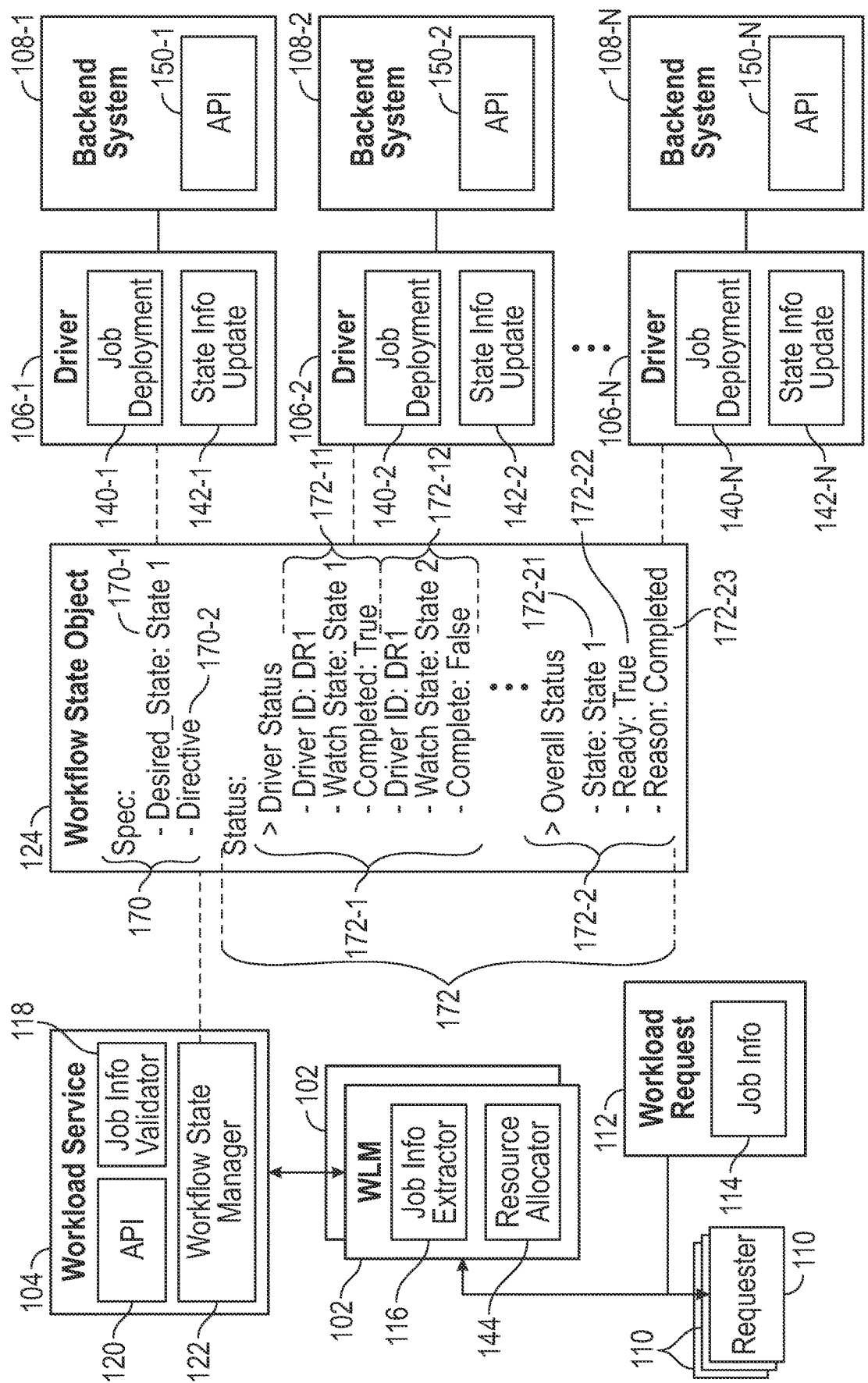
FIG. 1 is a block diagram of an arrangement that includes a workload manager, a workload service, drivers, and backend systems associated with the drivers, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Workload managers (a workload manager can include a program executed in a computer system) may be employed to submit workloads to computer systems to execute the workloads, in response to requests for work submitted by requesters. A "requester" can refer to a user, a program, or a machine. Computer systems to which tasks of workloads can be submitted can be referred to as "backend systems." A "backend system" refers to any processing resource that can be used to execute a workload task. A "processing resource" can refer to a collection of computers or a collection of processors. A processor can include a microprocessor, a core of a multi-core microprocessor, a microcontroller, a programmable integrated circuit, a programmable gate array, or another hardware processing circuit.

As used here, a "collection" of items can refer to a single item or multiple items. Thus, for example, a "collection of computers" can refer to a single computer or multiple computers.

A workload request submitted by a requester to a workload manager for performing a workload can specify various requirements, including any or some combination of the following: type(s) of resource(s) to be employed, a quantity of each type of resource, an indicator of backend system(s) on which a specific workload task is to be performed, and other requirements. A workload can include a number of tasks (one task or multiple tasks).

The workload request can also include a directive (or multiple directives). As examples, directives can include a directive to provision a new file system, a directive to add data to a file system, a directive to delete a file system, a directive to migrate data between storage systems, a directive to reserve network resources, a directive to inform a storage system as to an input/output (I/O) pattern, and so forth. More generally, a "directive" refers to command information that indicates a workload (including a number of tasks) to be performed.

The workload manager fulfills the requirements for the workload request (including allocating resources) and then starts the work processing on selected backend system(s). A backend system can include an application programming interface (API) that is accessible by the workload manager. An "API" refers to an interface implemented with machine-readable instructions that allows multiple programs and/or machines to communicate or interact with one another through the interface. An API defines rules that can be used for programs and machines to communicate. For example, a first entity (a program or a machine) can make an API call to the API, which responds by contacting a second entity (a program or a machine). When the API receives a response form the second entity, the API can send the response to the first entity.

Examples of APIs can include any or some combination of the following: a Representational State Transfer (REST) API, a storage provisioning API, a file system provisioning API, a configuration API, and so forth.

Different workload managers can have different mechanisms that allow the workload managers to target backend system APIs to deploy workload tasks. However, having each workload manager directly connecting to backend system APIs can add to the complexity of the workload manager, which can be costly to set up and maintain. For example, a workload manager would have to be configured to support each individual backend system API and may have to be continually modified to support new backend systems. For example, when new use cases are added, new or modified backend systems may be deployed, and each workload manager would have to be modified, e.g., by a user or system administrator, to support the new/modified backend systems.

Although reference is made to "APIs" in some examples discussed herein, in other examples, other types of interfaces to allow communication and interaction among entities can be employed.

Moreover, when a workload manager connects to a backend system, the workload manager is configured to understand and interpret directives that may be submitted by requesters. The workload manager is responsible for mapping each directive to the appropriate backend system(s) to perform the requested work. In conventional systems, configuring a workload manager to be able to interpret directives further adds to the complexity of the workload manager.

In accordance with some implementations of the present disclosure, a system includes a workload manager that is decoupled from backend systems that perform tasks of a workload. Accordingly, systems according to some examples of the present disclosure can obviate having to provide continual updates and maintenance to the workload manager. Further, systems according to some examples of the present disclosure can reduce the complexity associated with coupling the workload manager to each backend system API.

In some examples of the present disclosure, a system may include a workload service. Drivers are associated with the backend systems, and the drivers interact with the workload service that is an intermediary between the workload manager and the drivers. The workload service provides state information that can be updated by any of the drivers as the drivers complete workload tasks. The state information can also be updated by the workload service based on detecting that a current state of the workload has been completed. The workload manager can determine when the workload can proceed from a current state to a next state of the workload.

A workload can have various states across which the workload can transition as tasks of the workload are completed. The states of the workload are part of a workflow that includes nodes representing the states and edges between the states, where each edge represents a transition from one state to another state in response to completion of a workload task (or multiple workload tasks). The multiple states of the workload make up a lifecycle of the workload, where a lifecycle starts at a first state and transitions through various states to an end state. Decoupling the workload manager from the backend systems means that the workload manager does not directly interact with the backend system APIs. Rather, the workload manager interacts with the workload service that is the intermediary between the workload manager and the drivers for the backend systems. In addition, the workload manager does not have to interpret job information (including job requirements and directives) contained in workload requests. Rather, the job information can be kept opaque to the workload manager. In this manner, the complexity and maintenance costs associated with workload managers can be reduced. The interpretation and processing of job information are instead handled by the workload service and the drivers according to some implementations of the present disclosure.

Additionally, since workload managers do not interpret job information in workload requests, the syntax of the job information can be made uniform across different workload managers. Accordingly, disclosed examples reduce the complexity associated with programming and maintaining a workload managers. Moreover, since workload managers do not directly connect to backend systems, new backend systems can be added and existing backend systems can be modified or replaced transparently to the workload managers.

FIG. 1 is a block diagram of an example arrangement that includes workload managers (WLMs) 102, a workload service 104, and drivers 106-1, 106-2, . . . , 106-N, N≥2.

Each of the workload managers 102, the workload service 104, and the drivers 106-1 to 106-N can be implemented as machine-readable instructions that can execute on respective processing resources. In some cases, the workload manager 102, the workload service 104, and drivers 106-1 to 106-N can execute on the same computer, or alternatively, they can execute on different computers.

In FIG. 1, each workload manager 102, workload service 104, and driver 106-i (i=1 to N) includes various modules. Each such module can represent a portion of the machine-readable instructions that make up the larger block.

Each driver is associated with a corresponding backend system 108-1, 108-2, or 108-N. A "driver," according to some examples of the present disclosure, manages the deployment of a workload task to a corresponding backend system. A "backend system" can refer to a processing resource that is used to perform a workload task. Note that the backend system can include both hardware and machine-readable instructions that can execute on the hardware to perform the corresponding workload task.

Each driver 106-1 to 106-N is able to track state information associated with a workload to determine when a corresponding workload task is to be initiated at the respective backend system. Thus, the driver 106-1 to 106-N may access and/or receive data indicative of the current state in the lifecycle of a workflow for the workload that is being executed. The driver may use this information to determine whether or not a workload task is to be triggered at the respective backend system.

Requesters 110 may submit workload requests, such as a workload request 112, to a workload manager 102. The workload request 112 includes job information 114, including job requirements and a collection of directives (one directive or multiple directives). The workload request can be in the form of a script, a file, a message, a markup language document, and so forth.

Each workload manager 102 includes a job information extractor 116, which can extract job information (e.g., 114) from a workload request (e.g., 112).

In accordance with some implementations of the present disclosure, the workload manager 102 does not interpret the job information extracted by the job information extractor 116. Rather, the workload manager 102 sends the job information to the workload service 104, without interpreting the job information. The uninterpreted job information is processed by the workload service 104.

In some examples, the workload service 104 can include a job information validator 118 that is used to validate the job information received from the workload manager 102. For example, the job information validator 118 can validate the syntax of the job information, such as the syntax of the directive(s) included in the job information. The validation of the syntax of the job information can be based on syntax rules provided to the workload service 104 by any or some combination of the drivers 106-1 to 106-N. If the syntax of the directive(s) is not correct, then the workload service 104 can prevent execution of the requested workload, and may return an error to the workload manager.

In some examples, the workload service 104 includes a workload service API 120 that each workload manager 102 can interact with. For example, the workload manager 102 can send extracted job information to the workload service API 120. The extracted job information received at the workload service API 120 can forwarded to the job information validator 118 of the workload service 104.

In examples where a workload manager 102 and the workload service 104 are deployed on different computers, the workload manager 102 can access the workload service API 120 over a network, such as a local area network (LAN), a wide area network (WAN), a public network such as the Internet, or another type of network. The workload service API 120 is thus a network accessible API, which is interposed between the workload managers 102 and the drivers 106-1 to 106-N. Each workload manager 102 thus interacts with the workload service API 120 rather than backend system APIs 150-1, 150-2, . . . , 150-N of the respective backend systems 108-1, 108-2, . . . , 108-N. As a result, the workload managers 102 are decoupled from the backend system APIs 150-1, 150-2, . . . , 150-N. The workload managers 102 may have zero knowledge of the backend system APIs 150-1, 150-2, . . . , 150-N and their capabilities.

Having the workload managers 102 interact with the workload service API 120 (as an intermediary between the workload managers 102 and the backend systems) rather than numerous backend system APIs can reduce implementation costs and maintenance costs of the workload managers 102. For example, as discussed above, this configuration facilitates the addition or removal of backend systems without having to update the workload manager. Further, by enabling a uniform syntax for communication with API 120 of the workload service 104, the creation and maintenance of the workload manager is rendered more efficient as the workload manager would not have to be configured with knowledge of the API associated with each individual backend system.

The workload service 104 also includes a workflow state manager 122, which can present state information that includes information pertaining to states associated with a workload performed in response to the received the job information. In some examples, the state information can be in the form of a workflow state object 124. One workflow state object 124 can be presented by the workflow state manager per workload.

"Presenting" a workflow state object (or more generally, workload state information) can refer to making the workflow state object accessible by other entities, such as the drivers 106-1 to 106-N and the workload manager 102. For example, the workflow state object may be stored in a storage location of a storage that can be accessed by the other entities. As another example, the other entities may subscribe to notifications of changes to the workflow state object, where changes can include creation of the workflow state object or a modification of the workflow state object. The notifications can be pushed to the drivers 106-1 to 106-N. As a further example, the other entities may poll the workload service 104 for the workflow state object.

The drivers 106-1 to 106-N have access to the directive(s) included in the extracted job information received by the workload service 104 from the workload manager 102. Also, the drivers 106-1 to 106-N have access to the state information associated with a requested workload in the form of the workflow state object 124 presented by the workload service 104.

Based on the content of the workflow state object 124, each driver 106-1 to 106-N has information indicating the current state of the workload in its lifecycle. Each driver 106-1 to 106-N includes respective job deployment logic 140-1 to 140-N. Job deployment logic 140-$i$ ($i$=1 to N) in the respective driver 106-$i$ uses the lifecycle information (as indicated by the workflow state object 124) to translate the job information (e.g., job information 114) into a workload task command that can be directed by the job deployment logic 140-$i$ to selected backend system API(s) 150-1 to 150-N at the appropriate time (e.g., when a current state has been completed, as indicated by the workflow state object 124). For example, the job deployment logic 140-$i$ may not direct a workload task to a backend system until the job deployment logic 140-$i$ detects that the current state has been completed, i.e., all workload tasks for the current state have been completed by the corresponding backend system(s) 108-1 to 108-N and indicated in the workflow state object 124.

The drivers 106-1 to 106-N can concurrently connect to respective backend system APIs 150-1 to 150-N so that multiple workload tasks can be deployed in parallel by the drivers to the backend systems 108-1 to 108-N.

Each driver 106-1 to 106-N also includes a respective state information update logic 142-1 to 142-N. A state information update logic 142-$i$ in a respective driver 106-$i$ receives a status update from a backend system 108-$i$ when a workload task(s) deployed by the job deployment logic 140-$i$ has (have) completed. In response to such a status update, the state information update logic 142-$i$ can update driver state information in the workflow state object 124.

In some examples, drivers and backend system APIs can be modified, swapped out, or added of a system (that includes the drivers 106-1 to 106-N and backend systems 108-1 to 108-N) without the knowledge of any of the workload managers 102. Swapping out a driver or backend system can refer to removing an existing driver or backend system and replacing the removed existing driver or backend system with a new driver or backend system. Also, the modification, swapping out, or addition of a driver or backend system can be performed without making any change to any of the workload managers 102.

When new drivers are installed or drivers are modified, the new/modified drivers may provide job information syntax rules to the workload service 104 for use by the job information validator 118.

Since the workload managers 102 do not have to interpret directives in a workload request, new use cases that involve use of new directives can be introduced without modifying the workload managers 102.

The workload service 104 facilitates the communication of information between the workload managers 102 and the backend system APIs 150-1 to 150-N. The workload service 104 can present integrated state information (in the form of the workflow state object 124, for example) independent of the quantity of drivers 106-1 to 106-N. The presented integrated state information is dependent upon the individual status of each of the drivers 106-1 to 106-N. For example, failure of one driver but success of other drivers would be reported as an overall failure to a workload manager 102. The workload service 104 can detect failure of a driver if the driver does not update its respective driver state information in the workflow state object 124, or if the driver returns an error indication to the workload service 104.

Workflow State Object

The example workflow state object 124 includes several sections, including a spec section 170 and a status section 172. The spec section 170 contains request information, which is received from a workload manager 102. The status section 172 contains state information that can be filled by various entities, including the drivers 106-1 to 106-N and the workflow service 104. The workflow service 104 can populate the spec section 170 with directive(s) included in the workload request. The status section 172 is created by the workload service 104 includes entries relating to the status for each driver that is to perform work in various states of a workload, and an overall status (discussed further below).

The spec section 170 includes a Desired_State field 170-1, and a Directive field 170-2. The Desired_State field 170-1 includes a state of the workload that is to be completed. In some examples, a workload manager 102 can update the Desired_State field 170-1 to a new state if the work for a current state has completed. In the example of FIG. 1, the Desired_State field 170-1 contains "State 1," which refers to a first state of the workload.

As used here, a "field" can refer to any information element in a larger structure or data object, such as the workflow state object 124.

The Directive field 170-2 contains a directive that is to be executed by backend system(s) for the workflow associated with the workflow state object 124. A directive that indicates a workload to be performed, and one or more drivers associated with respective one or more backend systems can perform tasks of the workload. If the workflow is associated with multiple directives, then there may be multiple Directive fields in the workflow state object 124 for the workflow.

The status section 172 includes a drivers status subsection 172-1 and an overall status subsection 172-2. The overall status subsection 172-2 contains status information for indicating whether or not the work for the current state (identified by the Desired_State field 170-1) has completed. The workload manager 102 can monitor the overall status subsection 172-2 to determine if the work for a current state has completed, and if so, the workload manager 102 can update the Desired_State field 170-1 to a new state so that work for the new state can begin (based on the drivers 106-1 to 106-N deploying respective workload tasks to the backend systems 108-1 to 108-N.

In some examples, the overall status subsection 172-2 is updated by the workload service 104, or more specifically, by the workflow state manager 122 of the workload service 104. The workflow state manager 122 can monitor the driver status information updated by drivers in the drivers status subsection 172-1. The current state (identified by the Desired_State field 170-1) is not considered to be complete unless all drivers have completed their respective work for the current state, and have indicated such completion in the drivers status subsection 172-1.

The overall status subsection 172-2 includes a State field 172-21 that is filled with the current state (State 1 identified in the Desired_State field 170-1 of the spec section 170). The overall status subsection 172-2 also includes a Ready field 172-22 that can be set to a true value or a false value, and a Reason field 172-23 that can specify a reason for the value included in the Ready field 172-22.

If the Ready field 172-22 contains a true value and the Reason field 172-23 indicates "completed," then that means that the work for State 1 is complete. If the Ready field 172-22 contains a false value or the Reason field 172-23 does not indicate "completed," then that means the work for State 1 is not complete.

The drivers status subsection 172-1 includes an array of driver state entries, including entries 172-11 and 172-12 in FIG. 1. Each driver state entry includes a Driver ID field to identify a driver, a Watch State field that indicates the state that the entry is associated with, and a Completed field that can be set to true (to indicate that work for the state in the Watch State field has been completed by the driver) or false (to indicate that work for the state in the Watch State field has not been completed by the driver).

The Driver ID field in the driver state entry 172-11 has the value DR1, which identifies a driver with the identifier DR1. The Watch State field in the driver state entry 172-11 has the value "State 1," which indicates that the driver state entry 172-11 relates to State 1 of the workload. The Completed field in the driver state entry 172-11 has a value true, which indicates that driver DR1 has completed the work for State 1.

The Driver ID field in the driver state entry 172-12 has the value DR1. The Watch State field in the driver state entry 172-12 has the value "State 2," which indicates that the driver state entry 172-12 relates to State 2 of the workload. The Completed field in the driver state entry 172-11 has a value false, which indicates that driver DR1 has not completed the work for State 2.

The other driver state entries of the drivers status subsection 172-1 can relate to the same driver DR1 or other drivers.

In an example where driver state entries in the drivers status subsection 172-1 indicate that work for State 1 are to be performed by multiple drivers, then the workflow state manager 122 of the workload service 104 will monitor the driver state entries relating to State 1 for the multiple drivers. If any of the driver state entries relating to State 1 indicates that the work for State 1 has not yet been completed by the respective driver, then the workflow state manager 122 will indicate in the overall status subsection 172-2 that the work for State 1 has not yet completed. However, if all of the driver state entries relating to State 1 indicate that the work for State 1 has been completed by the multiple drivers, then the workflow state manager 122 will indicate in the overall status subsection 172-2 that the work for State 1 has completed.

In some examples, the workflow state object 124 can be a file written in YAML (YAML Ain't Markup Language). In other examples, the workflow state object 124 can have a different format, such as in another markup language, in script format, and so forth. Further, the workflow state object 124 may include fewer or more fields than those described above.

In some examples, the workload service 104 can include a component of Kubernetes referred to as kube-apiserver to store and serve the workflow state object 124. In other examples, the workload service 104 can present the workflow state object 124 in a different way.

The drivers 106-1 to 106-N have access to the directives contained in various workflow state objects presented by the workload service 104 for respective workloads. The directives can be pushed by the workload service 104 to the drivers 106-1 to 106-N. For example, the drivers 106-1 to 106-N can subscribe to receive notifications of new workflow state objects or modifications of workflow state objects. Thus, when a new workflow state object is created or a workflow state object is modified, the workload service 104 can broadcast the new workflow state object or the change (delta) in the modified workflow state object to all of the drivers 106-1 to 106-N. Alternatively, the drivers 106-1 to 106-N can poll the workload service 104 to fetch information in the workflow state objects.

Based on the content of a workflow state object (e.g., 124), the drivers 106-1 to 106-N can determine whether the drivers are to perform work for any given state of a workload.

For example, since the driver state entries 172-11 and 172-12 identify driver DR1 for State 1 and State 2, respectively, driver DR1 can determine based on the workflow state object 124 that driver DR1 is to perform work for State 1 and State 2. In an example, for driver DR1, the workflow state object 124 may not include a driver state entry for State 3, which indicates to driver DR1 that it does not have to perform any work for State 3.

Figure 2:
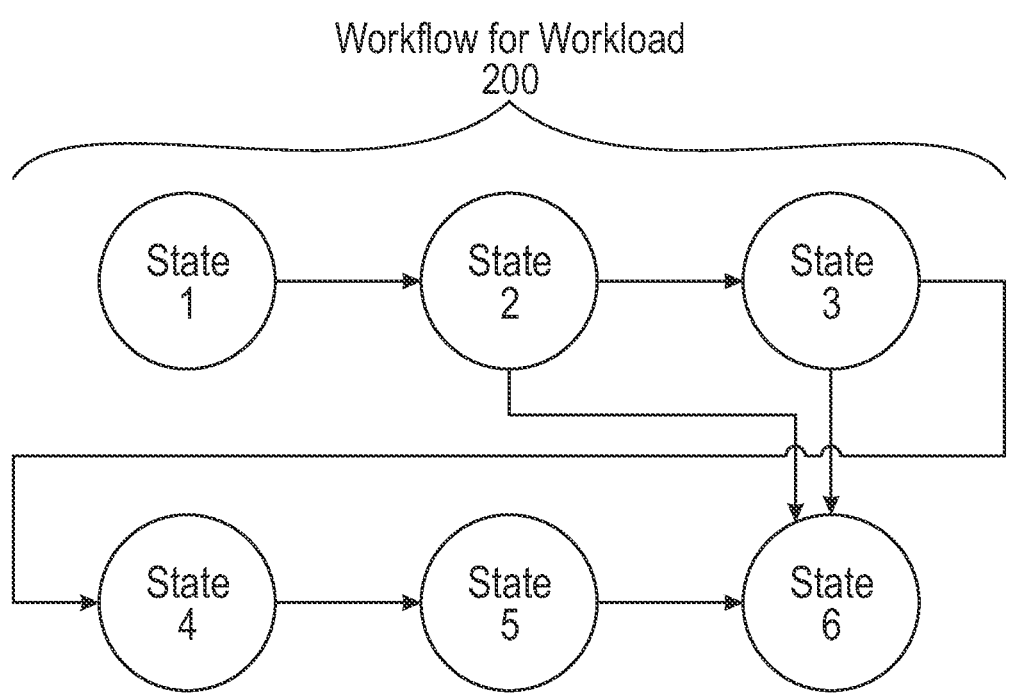
FIG. 2 is a block diagram of states of a workflow for a workload according to some examples.

FIG. 2 is a state diagram of a workflow 200 for an example workload. The workflow 200 includes various states (States 1 to 6 in the example shown) and edges between certain states. Each edge represents a transition from one state to another state. The workflow 200 can start in State 1 and ends in State 6. For each state, workload task(s) of the particular workload may be performed by a respective collection of drivers (one driver or multiple drivers). When the workload task(s) for the state has (have) been completed by the respective collection of drivers, then the respective collection of drivers can update corresponding driver state entries in the workflow state object. For example, driver DR1 and DR2 may be involved in performing workload tasks for all of States 1 to 6, but driver DR3 may be involved in performing workload tasks for just States 3 and 5 but not for the remaining states.

When the workflow state manager 122 in the workload service 104 detects that workload task(s) for a given state have been completed by the respective collection of drivers (based on monitoring the corresponding driver state entries of the workflow state object 124), the workflow state manager 122 updates the overall status subsection 172-2 of the workflow state object 124 to indicate that work for the given state has been completed.

In response to such indication in the overall status subsection 172-2, the workload manager 102 that sent the workload request for the particular workload to the workload service updates the Desired_State field 170-1 of the Spec section 170 with the next state of the workflow to be performed.

The drivers monitor the Desired_State field 170-1 (which can be pushed to the drivers or pulled by the drivers), and upon detection that the Desired_State field 170-1 has been updated to the next state, the drivers can each determine (based on the driver state entries) whether or not the driver is to perform work for the next state. For example, if driver DR1 detects that there is a driver state entry with a Driver ID field identifying DR1 and a State field identifying the next state, then driver DR1 proceeds to initiate work for the next state by submitting corresponding workload task information to the respective backend system API. As an example, driver DR1 can translate the directive in the workflow state object 124 (in the Directive field 170-2) into a format that can be understood by the respective backend system. When the respective backend system completes the work for the next state, the respective backend system API returns a completion indication to driver DR1, which then updates the driver state entry with the Driver ID field identifying DR1 and the State field identifying the next state.

On the other hand, if driver DR2 determines that there is no driver state entry with a Driver ID field identifying DR2 for the next state, the driver DR2 performs no work for the next state.

More generally, a given driver examines the Desired_State field 170-1 and compares the state in the Desired_State field 170-1 with the state in the Watch State field of the corresponding driver state entry for the given driver. If the states in the Desired_State field 170-1 and the Watch State field of the corresponding driver state entry for the given driver match, and the Completed field in the corresponding driver state entry does not have the value Completed, then the given driver would proceed to initiate work for the state by engaging with a corresponding backend system.

The other drivers of the back end systems would perform similar actions.

The workload state manager 122 of the workload service 104 can interact with the drivers 106-1 to 106-N when a workflow is being created for a particular workload, such as in response to the workload service 104 receiving job information from a workload manager 102. When a driver is initially installed, the driver can provide the workload service 104 with rule information that governs the augmentation of a workflow state object (e.g., 124) with driver state entries for the driver. The rule information (e.g., mapping information that maps directives to drivers) may indicate which directives are relevant to the driver (i.e., which directives the driver is to perform work for), and the workload state manager 122 can then determine based on the rule information for the drivers 106-1 to 106-N which drivers are to perform work for which states in the workflow.

As noted above, the workload manager 102 that submitted the job information for the workload associated with the workflow state object 124 is responsible for updating the Desired_State field 170-1 of the Spec section 170 in response to the workload manager 102 detecting that the overall status subsection 172-2 indicating that work for the current state has been completed. When the workflow state object 124 was initially created, the drivers 106-1 to 106-N may have submitted rule information pertaining to resources (e.g., storage resources, processing resources, etc.) that the drivers are to use to initiate workload tasks to the backend systems. Different resources may have to be allocated prior to proceeding to the next state. Upon detecting from the overall status subsection 172-2 that the current state is complete, a resource allocator 144 in the workload manager 102 may then allocate the resources for the next state, before updating the Desired_State field 170-1 of the Spec section 170 with the next state.

In some examples, by having the drivers 106-1 to 106-N determine whether the drivers are to perform work for a current state of a workload, less processing is performed at the workload service 104, which allows the workload service 104 to be smaller and less complex. Also, new functionality can be delivered by installing new drivers, rather than adding a new workload service 104 or modifying the workload service 104. Each driver can be developed independently by, say, different teams or vendors. The development of the driver does not involve modifying the code for the workload service 104.

Additionally, using intelligent drivers according to some examples of the present disclosure provides a more robust approach with respect to failure recovery. In the presence of failures, the drivers, rather than on the workload service 104, are responsible to recover from the failures. For example, if a driver crashes and restarts, the driver has to fetch the latest state and then recover or restart whatever operations with the backend system are appropriate. The workload service 104 may not even be aware there was a failure; the workload service 104 will just see that something (the restarted driver) reconnected.

Moreover, the drivers can work in parallel without the workload service 104 managing the parallel work. The drivers may coordinate the parallel work amongst themselves, such as to resolve conflicts or to synchronize the work. The drivers can communicate with one another, e.g., via a wired or wireless network. In other cases, drivers can perform parallel work without any coordination or synchronization if the parallel work are independent of one another.

Figure 3:
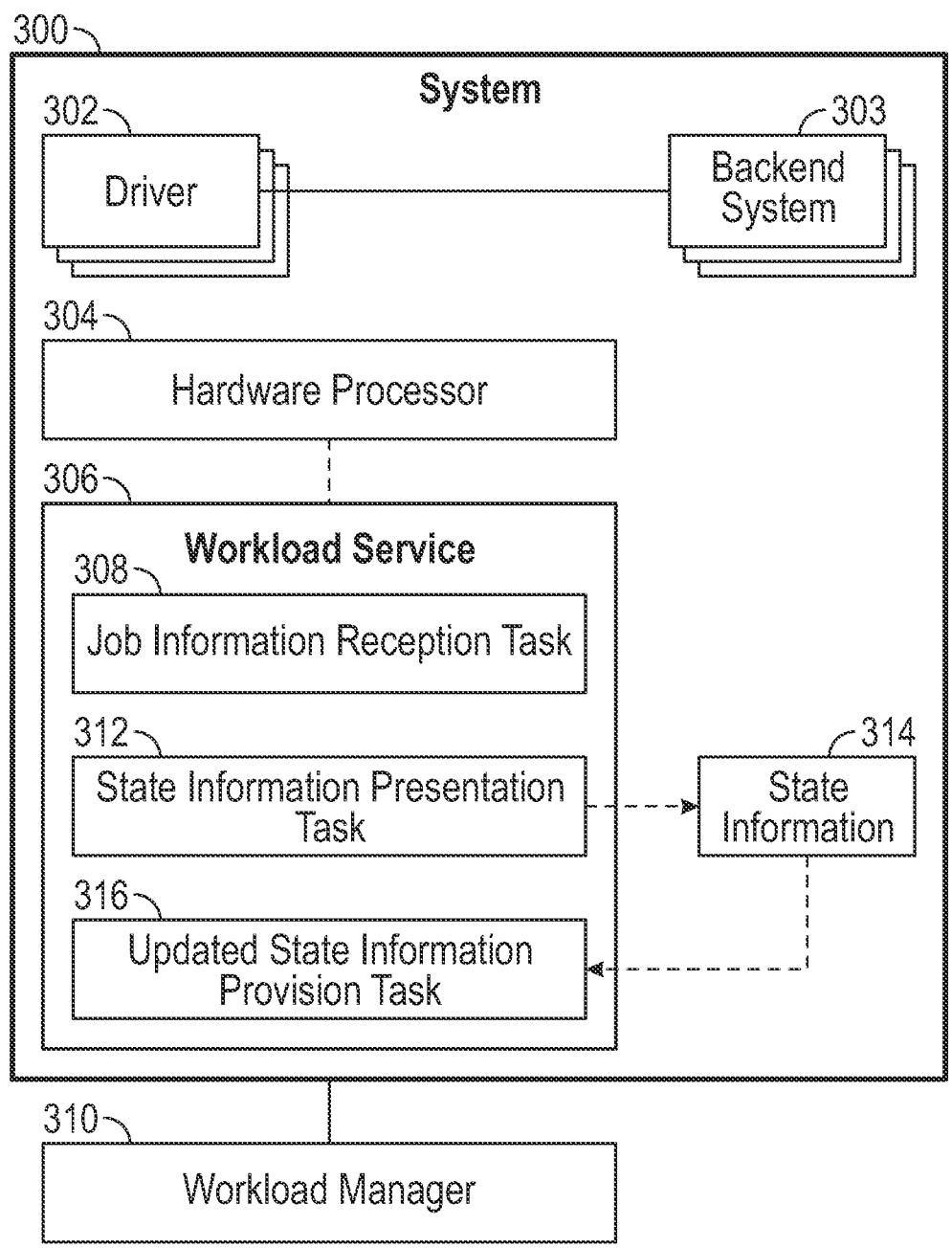
FIG. 3 is a block diagram of a system according to some examples.

FIG. 3 is a block diagram of a system 300 according to some examples. The system 300 can be implemented with a computer or multiple computers. The system 300 includes a plurality of drivers 302 for respective backend systems 303 that are to perform workload tasks.

In some examples, the plurality of drivers 302 are to interact with the respective backend systems 303 using APIs of the backend systems 303.

The system 300 includes a hardware processor 304 (or multiple hardware processors).

The system 300 includes a workload service 306 (including machine-readable instructions) executable on the hardware processor 304 to perform various tasks. Machine-readable instructions executable on a hardware processor can refer to the instructions executable on a single hardware processor or the instructions executable on multiple hardware processors.

The workload service 306 is executable to perform a job information reception task 308 that receives, from a workload manager 310, job information relating to a workload, the job information submitted by a requester and the job information uninterpreted by the workload manager 310.

In some examples, the workload manager 310 is decoupled from the backend systems 303, and the workload manager 310 is to transmit, to the workload service 306, the job information without interpretation by the workload manager 310. In some examples, the workload manager 310 is without knowledge of the APIs of the backend systems 303, meaning the workload manager 310 is agnostic to any backend systems.

In some examples, the workload service 306 is executable to present a workload service API to the workload manager 310.

The workload service 306 is executable to perform a state information presentation task 312 to, in response to receiving the job information, present state information 314 representing states of the workload. For example, state information 314 may be transmitted to or accessible by driver 302.

The workload service 306 is executable to perform an updated state information provision task 316 to, as the state information 314 is updated during performance of tasks of the workload by at least one driver of the plurality of drivers, provide the updated state information to the plurality of drivers.

A respective driver of the plurality of drivers 302 is to cause a corresponding backend system 303 to perform a task of the workload based on the updated state information. In some examples, the respective driver is to further update the state information as the respective driver completes the task of the workload.

In some examples, the workload service 306 is executable to set an indication (e.g., in the overall status subsection 172-2) in the state information 314 in response to detecting a completion of a current state of the states of the workload.

In some examples, the workload manager 310 is responsive to the indication set by the workload service 306 to perform a resource allocation prior to the workload proceeding to a next state of the workload.

In some examples, the workload manager 310 is to update a target state field (e.g., Desired_State field 170-1) in the state information after performing the resource allocation and determining that the workload can proceed to the next state.

In some examples, the plurality of drivers 302 are to coordinate with one another in performing tasks of the workload in parallel.

Figure 4:
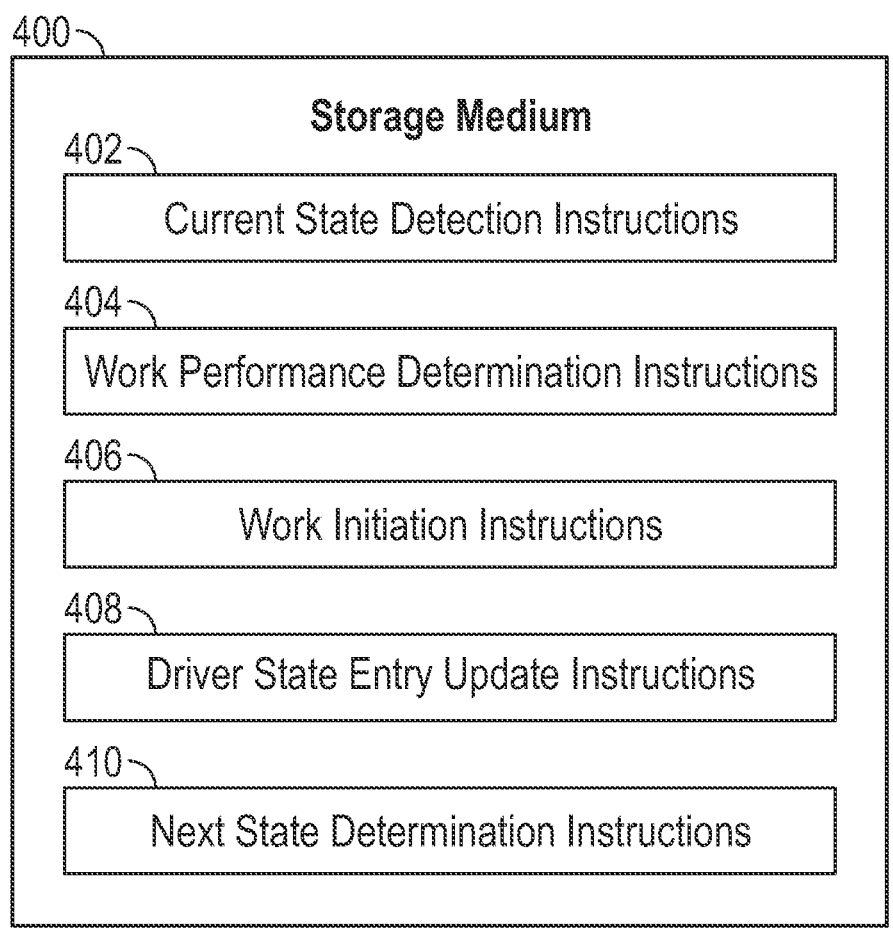
FIG. 4 is a block diagram of the storage medium storing machine-readable instructions according to some examples.

FIG. 4 is a block diagram of a non-transitory machine-readable or computer-readable storage medium 400 storing machine-readable instructions that upon execution cause a system (a computer or multiple computers) to perform various tasks.

The machine-readable instructions include current state detection instructions 402 to detect, by drivers based on state information provided by a workload service, that a workflow for a workload is at a current state. The state information may be included in a workflow state object (e.g., 124 in FIG. 1), which can include a target state field (e.g., the Desired_State field 170-1) that indicates the current state of the workload.

The machine-readable instructions include work performance determination instructions 404 to determine, by the drivers based on driver state entries in the state information, a subset of the drivers are to perform work for the current state. Each driver state entry of the driver state entries includes a field identifying a respective driver, and a field identifying a respective state.

The machine-readable instructions include work initiation instructions 406 to, in response to the determination, initiate, by each driver of the subset of the drivers, corresponding work for the current state with a respective backend system of a plurality of backend systems. The driver can translate a directive in the job information into a format to send to an API of a backend system, for example.

The machine-readable instructions include driver state entry update instructions 408 to update, by each driver of the subset of the drivers, a corresponding driver state entry in the state information as the corresponding work is completed by the respective backend system. The driver state entry may include a Completed field to indicate whether or not the corresponding work is completed by the respective driver.

The machine-readable instructions include next state determination instructions 410 to determine, by the drivers based on an update of the state information by a workload manager, to proceed to a next state of the workflow. Note that the next state determination instructions 410 can be the current state detection instructions 402—detecting a changed current state can establish that the workflow is in the next state.

Figure 5:
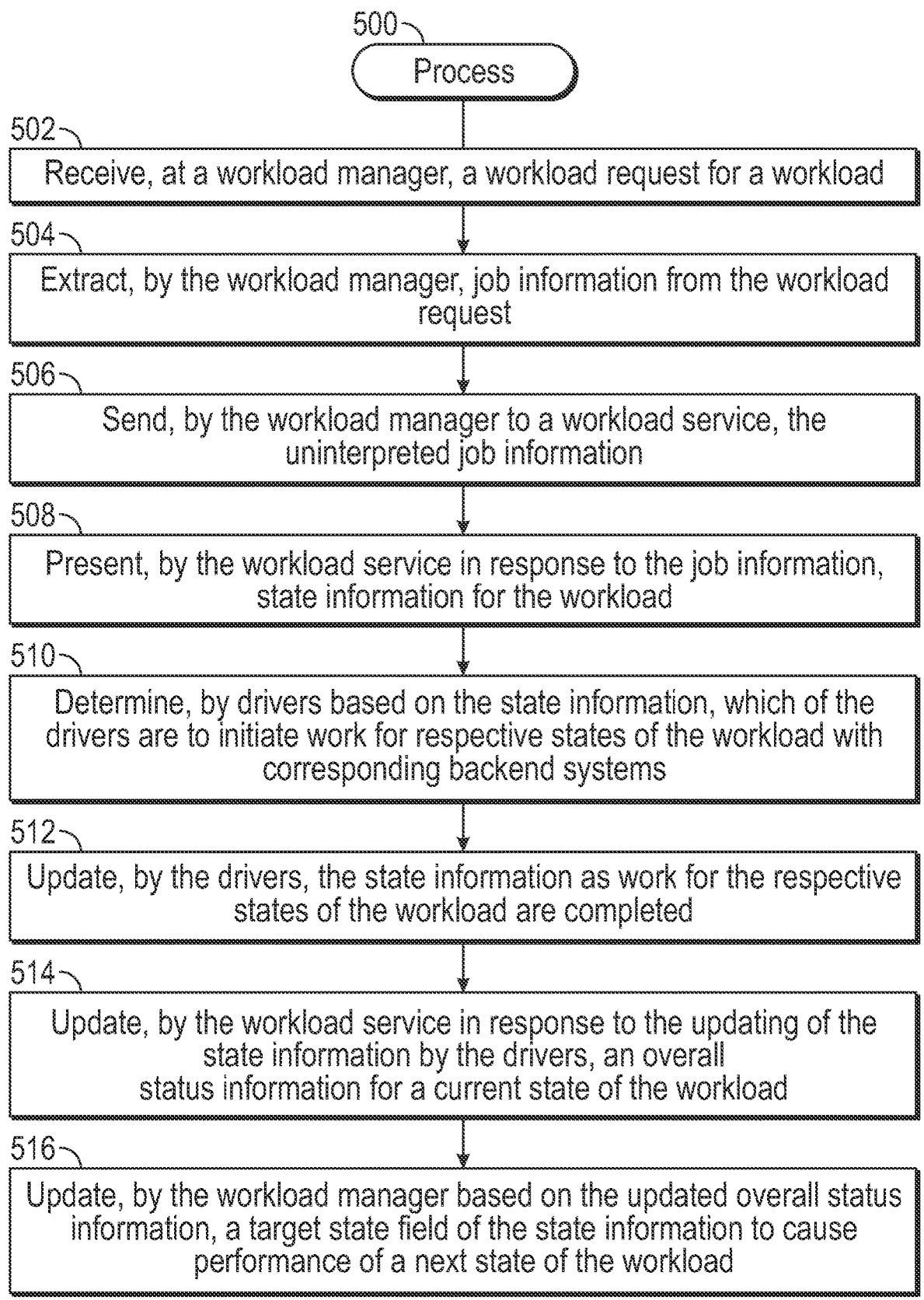
FIG. 5 is a flow diagram of a process according to some examples.

FIG. 5 is a flow diagram of a process 500 that can be performed by a system.

The process 500 includes receiving (at 502), at a workload manager, a workload request for a workload. The workload request may be received from a requester.

The process 500 includes extracting (at 504), by the workload manager, job information from the workload request. The job information extracted by the workload manager is uninterpreted by the workload manager.

The process 500 includes sending (at 506), by the workload manager to a workload service, the uninterpreted job information. The uninterpreted job information may be sent by the workload manager to an API of the workload service.

The process 500 includes presenting (at 508), by the workload service in response to the job information, state information for the workload. The state information may be included in a workflow state object (e.g., 124 in FIG. 1).

The process 500 includes determining (at 510), by drivers based on the state information, which of the drivers are to initiate work for respective states of the workload with corresponding backend systems. This determination can be based on driver state entries of the state information, for example.

The process 500 includes updating (at 512), by the drivers, the state information as work for the respective states of the workload are completed. The drivers can update the driver state entries, for example.

The process 500 includes updating (at 514), by the workload service in response to the updating of the state information of the state information by the drivers, an overall status information for a current state of the workload. The updated overall status information can indicate that all work for the current state has been completed by the appropriate drivers.

The process 500 includes updating (at 516), by the workload manager based on the updated overall status information, a target state field of the state information to cause performance of a next state of the workload. The drivers may respond to the update of the target state filed by initiating work for the next state.

A storage medium (e.g., 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a plurality of drivers for respective backend systems that are to perform workload tasks;
a hardware processor; and
a workload service executable on the hardware processor to:
receive, from a workload manager, job information relating to a workload, the job information submitted by a requester and the job information uninterpreted by the workload manager,
receive a syntax rule from a driver of the plurality of drivers as the driver is installed in the system,
in response to receiving the job information, validate the job information using the syntax rule and present state information representing states of the workload, and
as the state information is updated during performance of tasks of the workload by at least one driver of the plurality of drivers, provide the updated state information to the plurality of drivers,
wherein a respective driver of the plurality of drivers is to cause a corresponding backend system to perform a task of the workload based on the updated state information.

2. The system of claim 1, wherein the workload manager is decoupled from the backend systems, and the workload manager is to pass, to the workload service, the job information without interpretation by the workload manager.

3. The system of claim 2, wherein the workload service is executable to present a workload service application programming interface (API) to the workload manager.

4. The system of claim 3, wherein the plurality of drivers are to interact with the respective backend systems using APIs of the backend systems, wherein the workload manager is without knowledge of the APIs of the backend systems.

5. The system of claim 1, wherein the workload service is executable to validate the job information received from the workload manager.

6. The system of claim 1, wherein the respective driver is to further update the state information as the respective driver completes the task of the workload.

7. The system of claim 6, wherein the workload service is executable to set an indication in the state information in response to detecting a completion of a current state of the states of the workload.

8. The system of claim 7, wherein the workload manager is responsive to the indication set by the workload service to perform a resource allocation prior to the workload proceeding to a next state of the workload.

9. The system of claim 8, wherein the workload manager is to update a target state field in the state information after performing the resource allocation and determining that the workload can proceed to the next state.

10. The system of claim 9, wherein a given driver of the plurality of drivers is to respond to the updated target state field by causing a respective backend system to perform a further task of the workload.

11. The system of claim 1, wherein the plurality of drivers are to coordinate with one another in performing tasks of the workload in parallel.

12. The system of claim 1, wherein the state information is included in a workflow state object, the workflow state object comprising a plurality of driver state entries, each respective driver state entry of the plurality of driver state entries comprising a first field to identify a driver of the plurality of drivers, a second field to identify a state for which the driver is to perform work, and a third field to indicate whether or not the work for the state has been completed by the driver.

13. The system of claim 12, wherein the workflow state object further includes a target state field identifying a target state of the workload, and wherein the respective driver is to:
compare the target state in the target state field with a state in the second field of a driver state entry for the respective driver, and
determine that the respective driver is to initiate performance of the task in response to the comparison.

14. The system of claim 13, wherein the workload service is executable on the hardware processor to:
determine, based on driver state entries that identify the target state, whether work for the target state have been completed by selected drivers, and
update overall status information in response to determining that work for the target state have been completed by the selected drivers.

15. The system of claim 14, wherein the selected drivers are drivers of the plurality of drivers identified by the driver state entries.

16. A non-transitory machine-readable storage medium comprising instructions that upon execution cause a system to:
detect, by drivers based on state information provided in a workflow state object, by a workload service, that a workflow for a workload is at a current state, the workflow state object comprising a plurality of driver state entries;
determine, by the drivers based on the plurality of driver state entries in the workflow state object, a subset of the drivers are to perform work for the current state, wherein each driver state entry of the plurality of driver state entries in the workflow state object includes a first field identifying a respective driver, and a second field identifying a respective state for which the respective driver is to perform work, and a third field indicating whether or not the work for the respective state has been completed by the respective driver;

in response to the determination, initiate, by each driver of the subset of the drivers, corresponding work for the current state with a respective backend system of a plurality of backend systems;

update, by each driver of the subset of the drivers, a corresponding driver state entry in a respective third field of the workflow state object as the corresponding work is completed by the respective backend system; and determine, by the drivers based on an update of the workflow state object by a workload manager, to proceed to a next state of the workflow.

17. The non-transitory machine-readable storage medium of claim 16, wherein the workload service is an intermediary between the workload manager and the drivers.

18. A method performed by a system comprising a hardware processor, comprising:

receiving, at a workload manager, a workload request for a workload;

extracting, by the workload manager, job information from the workload request;

sending, by the workload manager to a workload service, the job information that is uninterpreted by the workload manager;

in response to receiving the job information at the workload service, present, by the workload service, state information for the workload, wherein the state information is included in a workflow state object, the workflow state object comprising a plurality of driver state entries, each respective driver state entry of the plurality of driver state entries comprising a first field to identify a driver of the plurality of drivers, a second field to identify a state for which the driver is to perform work, and a third field to indicate whether or not the work for the state has been completed by the driver, determining, by drivers based on the workflow state object, which of the drivers are to initiate work for respective states of the workload with corresponding backend systems;

updating, by the drivers, respective third fields of the workflow state object as work for the respective states of the workload are completed;

in response to the updating of the respective third fields of the workflow state object by the drivers, updating, by the workload service, an overall status information for a current state of the workload stored in the workflow state object; and based on the updated overall status information, updating, by the workload manager, a target state field of the workflow state object to cause performance of a next state of the workload.

19. The method of claim 18, wherein the workload manager is decoupled from the backend systems, and the workload manager is to interact with an interface of the workload service.

* * * * *